US005808260A

United States Patent [19]

Asakura et al.

[11] Patent Number: 5,808,260

[45] Date of Patent: Sep. 15, 1998

[54] METHOD OF CONNECTING WIRE MATERIALS TO CONNECTING TERMINAL

[75] Inventors: Nobuyuki Asakura; Tetsuro Ide, both of Shizuoka, Japan

[73] Assignee: Yazaki Corporation, Tokyo, Japan

[21] Appl. No.: 762,851

[22] Filed: Dec. 6, 1996

[30] Foreign Application Priority Data

Dec. 12, 1995 [JP] Japan .................................... 7-322762

[51] Int. Cl.$^{6}$ .................................................. B23K 11/10

[52] U.S. Cl. ......................................... 219/56.22; 439/874

[58] Field of Search ............................. 219/56.22, 56.21, 219/117.1; 439/874, 875

[56] References Cited

U.S. PATENT DOCUMENTS

| | | | |
|---|---|---|---|
| 3,333,083 | 7/1967 | Brunstetter et al. | 219/56.22 |
| 3,368,059 | 2/1968 | Scott et al. | 219/56.22 |
| 3,435,184 | 3/1969 | Schroeppel et al. | 219/56.21 |
| 3,566,008 | 2/1971 | Ettinger et al. | 219/56.22 |
| 3,739,323 | 6/1973 | Spors | 439/875 |
| 4,317,277 | 3/1982 | Bennett et al. | 439/874 |

FOREIGN PATENT DOCUMENTS

| | | |
|---|---|---|
| 4-95372 | 3/1992 | Japan . |
| 6-267595 | 9/1994 | Japan . |

*Primary Examiner*—Clifford C. Shaw
*Attorney, Agent, or Firm*—Armstrong, Westerman, Hattori, McLeland & Naughton

[57] ABSTRACT

With plural conductive wire materials wrapped by a connecting plate, the plural conductive materials being located between a first electrode and a second electrode of a power supply, the first electrode abutting on the conductive wire materials, the second electrode opposite to the first electrode abutting on said connecting plate, a voltage is applied between the first and the second electrode by the power supply so that the conductive wire materials are welded to the connecting plate. Thus, there is provided a method of connecting the conductive wire materials to the connecting plate which can prevent damages of the vicinity of a crimping portion due to heat and provide complete metallic coupling between the wire materials and the connecting plate with less electric power without using a third member such as metal having a low melting point.

16 Claims, 7 Drawing Sheets

METHOD OF CONNECTING WIRE MATERIALS TO CONNECTING TERMINAL

BACKGROUND OF THE INVENTION

1. Field of the Invention

The present invention relates to a method of connecting wire materials to a connecting terminal and more particularly, to a method of connecting an electric wire to a connecting terminal through the use of wire materials, in particular, a wiring harness.

2. Description of the Prior Art

In order to enhance reliability of electrical characteristics, mechanical strength, etc. in the connection between an electric wire and a connecting terminal, a method of making a metallic coupling or connection between the electric wire of a crimping portion and a connecting terminal has been proposed in JP-A-4-95372 (hereinafter "JP '372").

The method of JP '372 uses an apparatus for connecting conductive wire materials as shown in FIGS. 5 to 7. The apparatus, of FIGS. 5–7, includes a pressurizing tool 107 consisting of an anvil 109, having a concave groove 109, and crimper 111, and an electrode having the same shape as that of the tool 107. The crimper 111 is located above and opposite of the anvil 109 and has a concave portion 119 for pressurizing. The concave portion 119 includes a pair of concave curves 119*a* for guiding a connecting terminal 117 and a protrusion 119*b* which is formed by joining of these concave curves 119*a* to protrude toward the anvil 109. The lower side 119*c* of each of the concave curves 119*a* is curved outwardly to permit easy guiding of the connecting terminal 117. The crimper 111 is coupled with an oil pressure cylinder device (not shown) and can freely rise or fall.

On the other hand, the electrode 108 has the same shape as that of the pressuring tool 107 as shown in FIG. 7, and is made of for example, tungsten alloy. A power supply 123 is connected between upper and lower electrodes 108*a* and 108*b* which constitutes the electrode 108.

By the above-described connecting apparatus, conductive wire materials 113 and 115 are wrapped within the terminals 117, which are integral to a connecting plate 127 through connection of a connecting point 128, and which are caulked by the pressuring tool 107. The caulked portions of the terminals 117 are arranged between the upper and lower electrodes 108*a* and 108*b* and are pressurized by the upper and lower electrodes 108*a* and 108*b*. A voltage is applied between both electrodes so that the electrodes themselves generate heat. Thus, thermal crimping for the conductive wire materials 113 and 115 is completed by heat and pressure.

Metal fittings for crimping an electric wire are disclosed in JP-A-6-267595 (hereinafter "JP '595"). The metal fittings, of JP '595, are intended to suppress the attenuation of the electric wire and electrodes for resistive welding and to reduce the contact resistance in a short time by small electric power without leading no fall in fixing force. As shown in FIGS. 9 and 10, a metallic belt 222 having a low melting point such as tin (Sn) is formed on an annular center line of a caulking portion 221 which is contact with a core portion 225. With resistive welding electrodes 231*a* and 231*b* abutting on both sides of the metal fittings, a welding current is passed between both electrodes 231*a* and 231*b* to melt the metallic belt 222. In this case, alloying of copper of the core portion 225 and tin of the metallic belt intends to reduce the welding resistance.

However, in the first prior art, a welding current flows between both electrodes along the path with a small electric resistance indicated by an arrow C in FIG. 8. Thus, the current apt to flow from the upper electrode to the lower electrode through the terminals, whereas the rate of the current for making mechanical coupling between the conductive wire materials and the terminals is decreased. Thus, damages due to heat for the vicinity of a crimping portion such as scorching of a wire cover or reduction in elasticity of the terminals is increased by generation of Joule heat during flow of current, and the metallic coupling between the electric wire and the terminals becomes incomplete.

On the other hand, where the teachings of JP '595 are adopted in order to provide the welding effect by a small amount of generated heat, a third member, such as metal having a low melting point, must be used.

SUMMARY OF THE INVENTION

An object of the present invention is to provide a method of connecting conductive wire materials to a connecting plate which can prevent damage in the vicinity of a crimping portion due to heat and which can provide complete metallic coupling with less electric power without using a third member, such as metal having a low melting point.

In accordance with the first aspect of the present invention, a method of connecting conductive wire materials is provided which includes the steps of: wrapping a connecting plate around plural conductive wire materials, the plural conductive wire materials being located between a first electrode and a second electrode of a power supply; causing the first electrode to abut the conductive wire materials; causing the second electrode, opposite to the first electrode, to abut the connecting plate; applying a voltage between the first and the second electrodes by the power supply so that the plural conductive wire materials are welded to the connecting plate.

In accordance with the second aspect of the present invention, preferably, the first electrode, abutting the conductive wire materials, has a square planar tip having a width and a length substantially equal to those of an exposed area of the conductive wire materials, whereas the second electrode abutting the connecting plate has a disk-shaped planar tip having a diameter sufficiently shorter than the width of the exposed area of the conductive wire materials.

In accordance with the third aspect of the present invention, preferably, the first and said second electrodes are arranged in a longitudinal direction of the conductive wire materials.

In accordance with the fourth aspect of the present invention, preferably, the conductive wire materials and the connecting plate correspond to a core portion and a crimping portion of a crimping terminal.

In accordance with the first aspect of the present invention, since with the first electrode abutting the conductive wire materials and the second electrode abutting the connecting plate, a current is passed between both electrodes, the rate of the current flowing between the conductive wire materials and the connecting plate can be passed, thereby enhancing the effect of heat generation at the connection portion between the wire material and the connecting plate.

In accordance with the second aspect of the present invention, since the first electrode abutting the the conductive wire materials has a square planar tip having a width and a length substantially equal to those of an exposed area of the conductive wire materials, whereas the second electrode abutting the connecting plate has a disk-shaped planar tip having a diameter sufficiently shorter than the width of the exposed area of the conductive wire materials, the rate of the current flowing between the conductive wire materials and the connecting plate can be increased, thus enhancing the effect of heat generation at the connection portion between the conductive wire material and the connecting plate.

In accordance with the third aspect of the present invention, since the first and the second electrode are arranged in a longitudinal direction of the conductive wire materials, the electrodes can be easily arranged and welding can be carried out, while the positions of the conductive wire materials and the connecting plate are monitored.

In accordance with the fourth aspect of the present invention, since with the first electrode abutting the conductive wire materials and with the second electrode abutting the connecting plate corresponding to a core portion and a crimping portion of a crimping terminal, the current is passed between both electrodes, the rate of the current flowing between the core wire portion and the crimping portion can be increased, thereby enhancing the efficiency of heat generation between the core portion and the crimping portion.

The above and other objects and features of the present invention will be more apparent from the following description taken in conjunction with the accompanying drawings.

DESCRIPTION OF THE PREFERRED EMBODIMENTS

Figure 1:
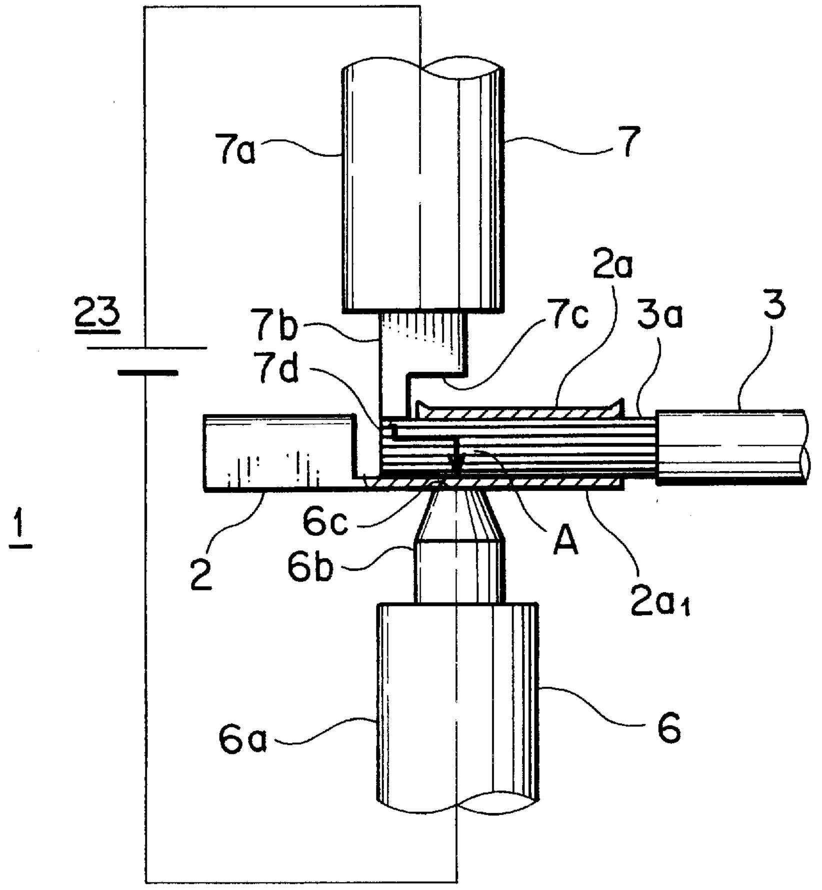
FIG. 1 is a partial cross-sectional view for explaining the first embodiment of a method of connecting conductive wire materials to a connecting terminal according to the present invention.

Now referring to the drawings, an explanation will be given of embodiments of a method for connecting conductive wire materials to a connecting terminal according to the present invention.

Figure 2:
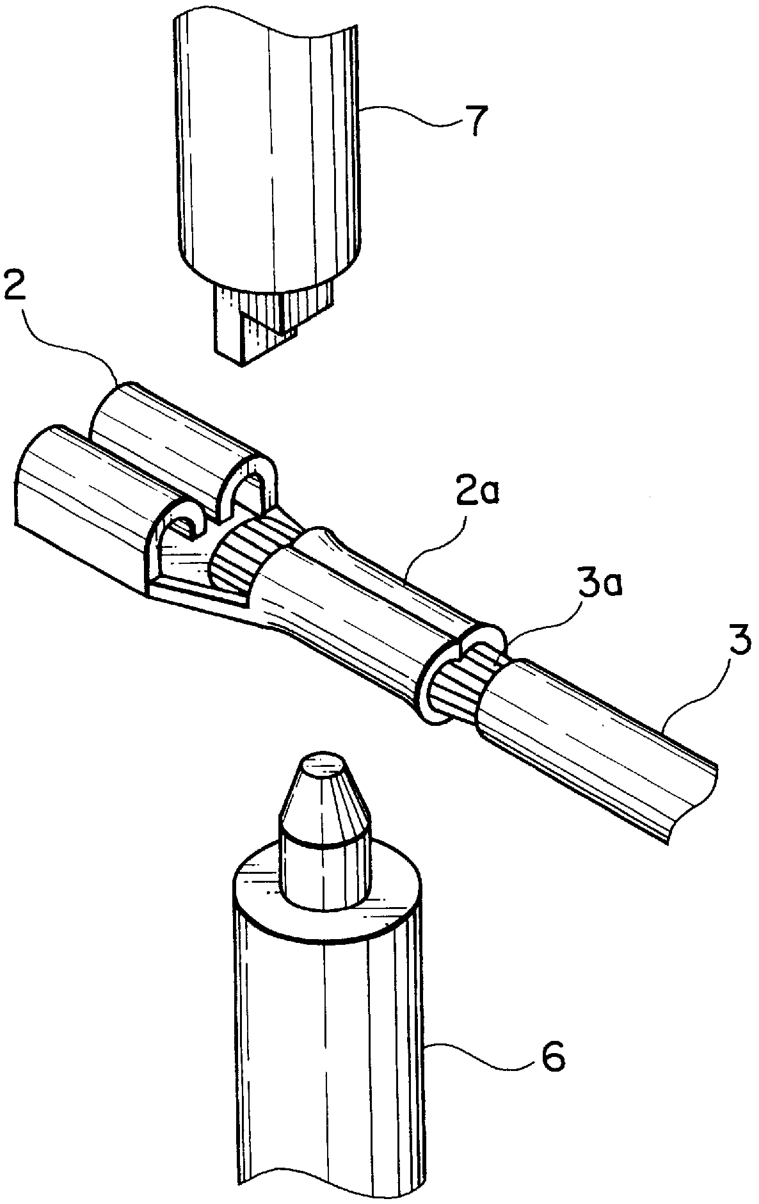
FIG. 2 is a perspective view for explaining the first embodiment of the method of connecting conductive wire materials to a connecting terminal according to the present invention.

FIGS. 1 and 2 are views for explaining the first embodiment of a method of connecting conductive wire materials according to the present invention. Specifically, FIG. 1 is a partial cross-sectional view showing electrodes 6, 7, a connecting terminal 2 and an electric wire 3. FIG. 2 is a perspective view of the electrodes 6, 7, connecting terminal 2 and electric wire 3 in FIG. 3 which shows the state before the electrodes 6, 7 are brought into contact with the connecting terminal 2 and electric wire 3.

Figure 5:
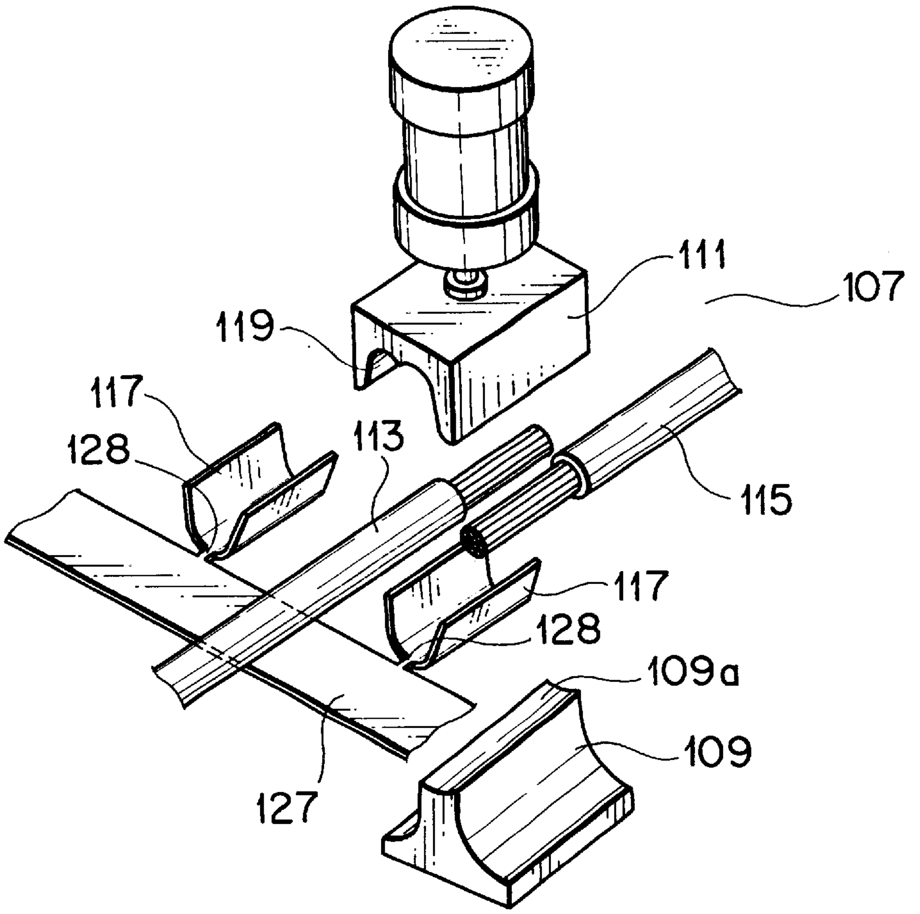
FIG. 5 PRIOR ART
FIG. 5 is a perspective view showing a pressurizing tool used in the conventional method for connecting conductive wire materials to a connecting terminal.
Figure 6:
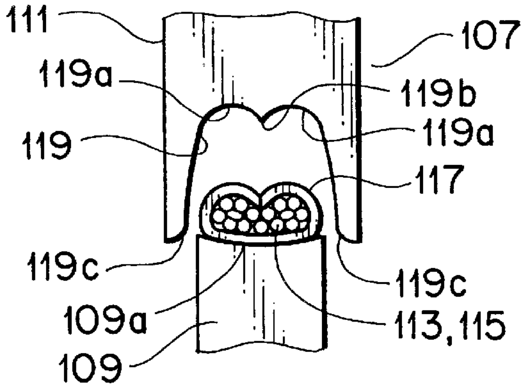
FIG. 6 PRIOR ART
FIG. 6 is an enlarged view of the pressurizing tool in FIG. 5.
Figure 7:
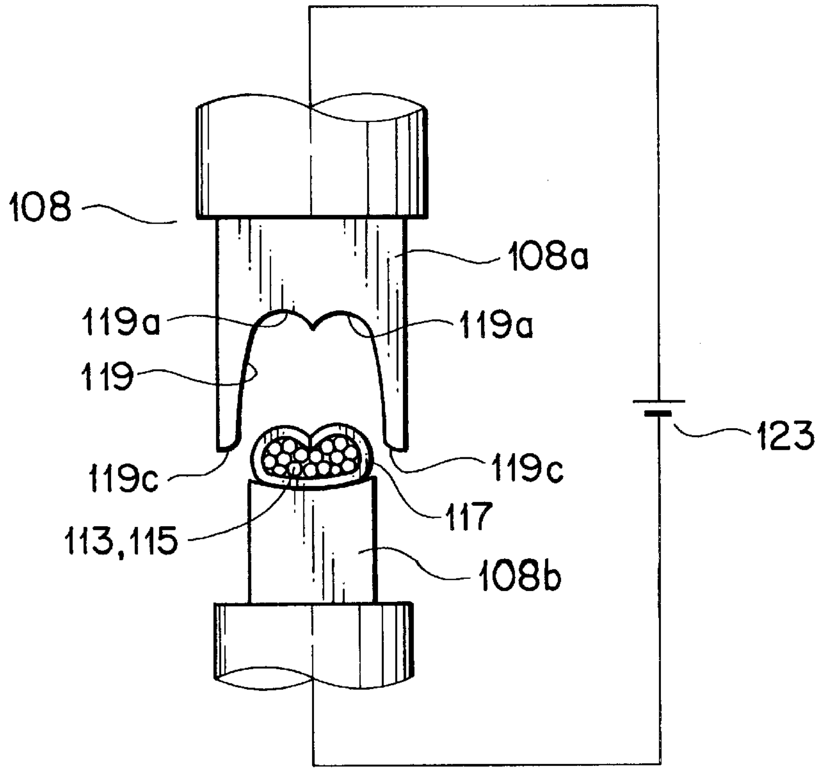
FIG. 7 PRIOR ART
FIG. 7 is an enlarged view used in the conventional method of connecting conductive wire materials to a connecting terminal.

As shown in FIG. 2, a core portion 3*a* of the electric wire 3 is crimped into a caulking portion 2*a* of the connecting terminal 2 before resistive welding by both electrodes 6, 7. This crimping method is the same as described in connection with the prior art. Specifically, for example, by using the pressurizing tool 107 in the apparatus shown in FIGS. 5 to 7, the core wire portion 3*a* of the electric wire 3 is crimped into the caulking portion 2*a* of the connecting terminal 2. Therefore, as shown in FIG. 1, with the electric wire 3 supported by a supporting apparatus (not shown), the welding between the caulking portion 2*a* and core portion 3*a* is performed by a resistive welding apparatus composed of two electrodes 6, 7 and a power supply 23.

The electrodes 6 and 7 may be made of tungsten alloy like the prior art. Both upper and lower electrodes 6 and 7 are located at opposite positions in a vertical direction. A stem 7*a* of the electrode 7 is formed of a cylindrical shape. A contact portion 7*b* of the upper electrode 7 to the core portion 3*a* is formed of a rectangular parallelepiped partially recessed so as to provide a stepping portion 7*c,* and a tip 7*d* of the upper electrode 7 abuts the core portion 3*a*.

On the other hand, a stem 6*a* of the lower electrode 6 is formed of a cylindrical shape. A contact portion 6*b* of the lower electrode 6, unlike the contact portion 7*b* of the upper electrode 7, is formed of a cylinder having a smaller diameter than that of the stem 6*a*. The end of the lower electrode 6 is tapered and the tip 6*c* thereof abuts the bottom $2a_1$ of the caulking portion 2*a* of the connecting terminal 2. The reason why the contact portion 6*b* of the lower electrode 6 is different from the contact portion 7*b* of the upper electrode 7 is that the tip 6*c* of the former must abut the bottom $2a_1$ of the caulking portion 2*a* of the connecting terminal 2, whereas the latter must abut the exposed portion of the core wire portion 3*a* of the electric wire 3 as shown in FIG. 1.

Figure 8:
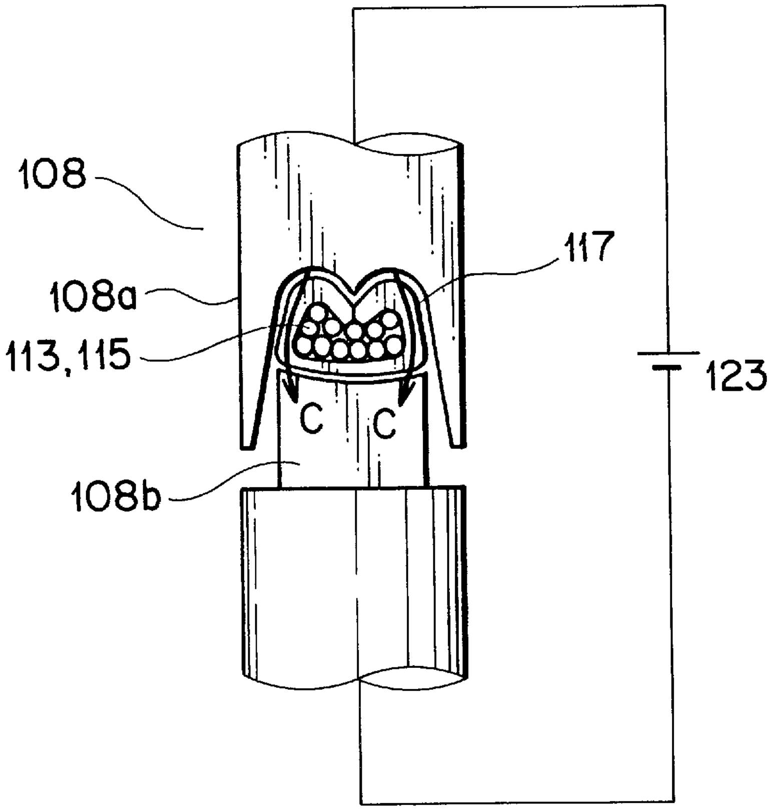
F I G. 8 PRIOR ART
FIG. 8 is a view for explaining the current path in the conventional method of connecting conductive wire materials to a connecting terminal.
Figure 9:
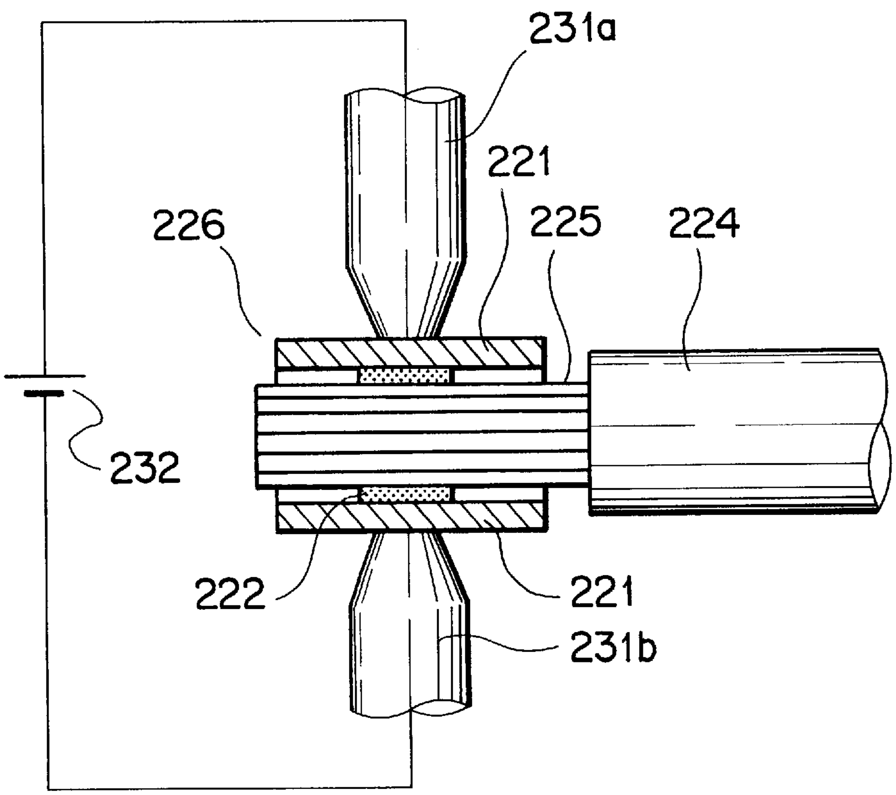
FIG. 9 PRIOR ART
FIG. 9 is a view for explaining the conventional crimping process for metal fittings for an electrode.
Figure 10:
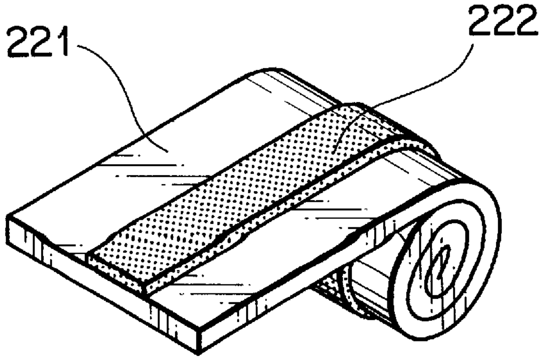
FIG. 10 PRIOR ART
FIG. 10 is a view for the crimping metal fittings shown in FIG. 9.

In this configuration, after the core portion 3*a* of the electric wire 3 is crimped into the caulking portion 2*a* of the connecting terminal 2 by caulking, the contact portion 6*b* of the lower electrode 6 is caused to abut the bottom $2a_1$ of the caulking portion of the connecting terminal 2, whereas the contact portion 7*b* of the upper electrode 7 is caused to abut the core portion 3*a*. Then, when a voltage is applied between both electrodes 6 and 7, a current flows between the contact portions 6*b* and 7*b* through the core portion 3*a* and caulking portion 2*a* along the path indicated by an arrow A in FIG. 1. Thus, the rate of the current flowing through the electric wire 3 and the connecting terminal 2 becomes larger than in the prior art (FIG. 8) and hence the amount of generated heat at the connection portion between the electric wire 3 and the connecting terminal 2 is also increased. As a result, a smaller quantity of electric power than in the prior arts permits complete metallic coupling between the electric wire 3 and the connecting terminal 2.

Figure 3:
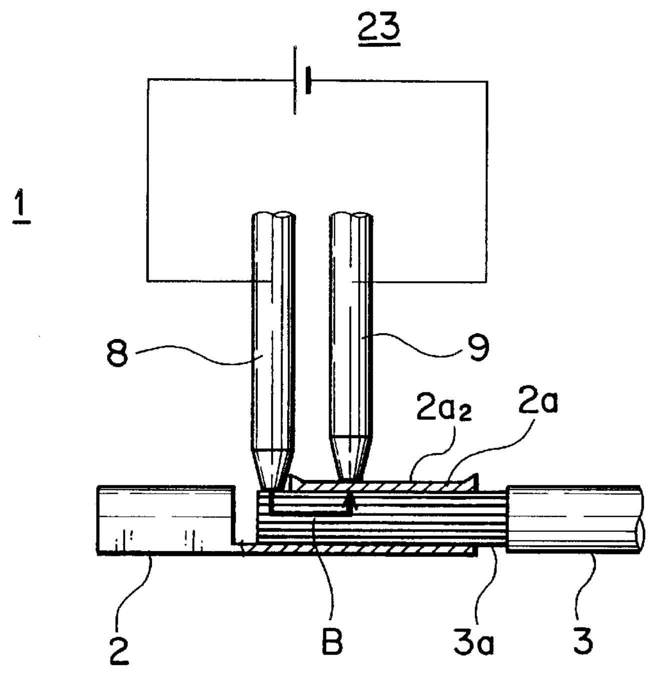
FIG. 3 is a partial cross-sectional view for explaining the second embodiment of a method of connecting conductive wire materials to a connecting terminal according to the present invention.
Figure 4:
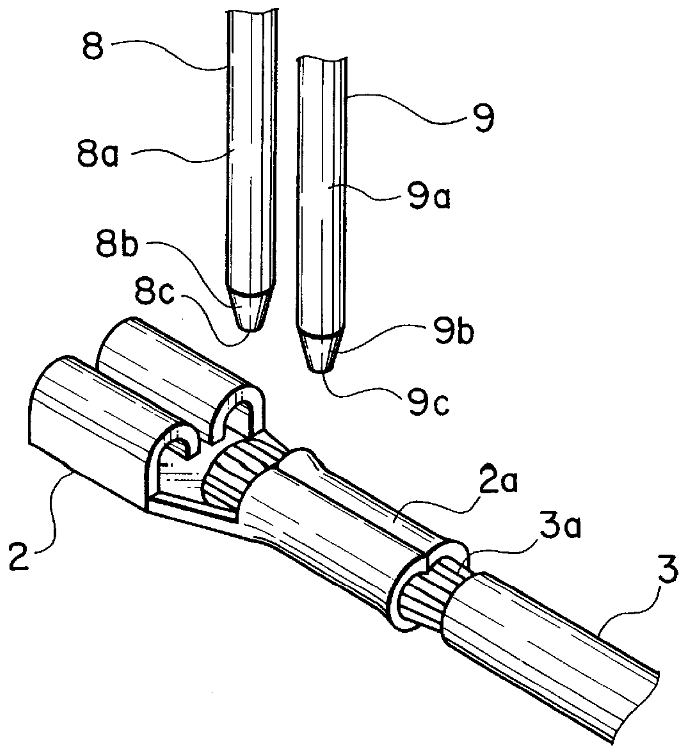
FIG. 4 is a perspective view for explaining the second embodiment of the method of connecting conductive wire materials to a connecting terminal according to the present invention.

Referring to FIGS. 3 and 4, an explanation will be given of the second embodiment of the method of connecting wiring materials according to the present invention.

FIG. 3 is a partial cross-sectional view showing electrodes 8, 9, a connecting terminal 2 and an electric wire 3. FIG. 4 is a perspective view of the electrodes 6, 7, connecting terminal 2 and electric wire 3 in FIG. 3 which shows the state before the electrodes 8, 9 abut the connecting terminal 2 or electric wire 3.

As shown in FIG. 4, a core portion 3*a* of the electric wire 3 is crimped into a caulking portion 2*a* of the connecting terminal 2 before resistive welding both electrodes 8, 9. This crimping method is the same as described in connection with the prior art as in the first embodiment. Specifically, for example, by using the pressurizing tool 107 in the apparatus shown in FIGS. 5 to 7, the core portion 3*a* of the electric wire 3 is crimped into the caulking portion 2*a* of the connecting terminal 2. Therefore, as shown in FIG. 3, with the electric wire 3 supported by a supporting apparatus (not shown), the welding between the caulking portion 2*a* and core wire portion 3*a* is performed by a resistive welding apparatus composed of two electrodes 8, 9 and a power supply 23.

The electrodes 8 and 9 may be made of tungsten alloy as in the prior art. Both electrodes 8 and 9 are arranged in parallel above the caulking portion 2*a* of the connecting terminal 2. Stems of 8*a* and 9*a* of these electrodes 8 and 9 are formed of a cylindrical shape, respectively, and have tapered portions 8*b*, 9*b*, respectively, so that they become gradually narrower toward the tips 8*c* and 9*c*. The reason why the tips 8*c* and 9*c* of both electrodes 8 and 9 are narrower than the stems 8*a* and 9*a* is that both electrodes 8 and 9 must abut on the top of the caulking portion 2*a* of the connecting terminal 2 or the core portion 3*a* of the electric wire 3.

In the above configuration, after the core portion 3*a* of the electric wire 3 is crimped into the caulking portion 2*a* of the connecting terminal 2 by caulking, the tapered portion 9*b* of the right electrode 9 is caused to abut the top $2a_2$ of the caulking portion 2*a* of the connecting terminal 2 whereas the tapered portion 8*b* of the left electrode 8 is caused to abut the core wire portion 3*a* of the electric wire 3. Then, when a voltage is applied between both electrodes 8 and 9, a current flows between the tapered portions 8*b* and 9*b* through the core wire portion 3*a* and the top of the caulking portion along the path indicated by an arrow B in FIG. 3. Thus, the rate of the current flowing through the electric wire 3 and the connecting terminal 2 becomes larger than in the prior art (FIG. 8) and hence the amount of generated heat at the connection portion between the electric wire 3 and the connecting terminal 2 is also increased. As a result, a smaller quantity of electric power than in the prior art permits complete metallic coupling between the electric wire 3 and the connecting terminal 2.

What is claimed is:

1. A method of connecting plural conductive wire materials to a connecting terminal comprising the steps of:

wrapping a plurality of conductive wire materials with an originally flat connecting plate to form a caulking portion surrounding said conductive wire materials;

locating said plurality of conductive wire materials between a first electrode and a second electrode of a power supply, wherein said first electrode is on an opposite side of said conductive wire materials from said second electrode;

staggering said first electrode and said second electrode so that a central longitudinal axis of said first electrode is parallel to and offset from a central longitudinal axis of said second electrode;

causing said first electrode to abut said conductive wire materials extending from said caulking portion toward said connecting terminal;

causing said second electrode to abut said connecting plate of said caulking portion;

applying voltage between said first electrode and said second electrode by said power supply so that current flows from said first electrode to said second electrode in a path that does not pass through said connecting terminal in order for said plural conductive wire materials to be welded to said connecting plate.

2. The method according to claim 1, wherein said step of locating said plurality of conductive wire materials between a first electrode and a second electrode includes providing said first electrode, abutting said conductive wire materials, with a square planar tip having a width and a length substantially equal to a width and a length of an exposed area of said conductive wire materials extending from said caulking portion toward said connecting terminal, and providing said second electrode, abutting on said conductive plate, with a disk-shaped planar tip having a diameter sufficiently shorter than said width of said exposed area of said conductive wire materials.

3. The method according to claim 2, wherein step of locating said plurality of conductive wire materials between a first electrode and a second electrode includes arranging said first and second electrodes in a longitudinal direction of said conductive wire materials.

4. The method according to claim 3, wherein said conductive wire materials and said connecting plate correspond to a core portion and a crimping portion of a crimping terminal.

5. The method according to claim 2, wherein said conductive wire materials and said connecting plate correspond to a core portion and a crimping portion of a crimping terminal.

6. The method according to claim 1, wherein step of locating said plurality of conductive wire materials between a first electrode and a second electrode includes arranging said first and second electrodes in a longitudinal direction of said conductive wire materials.

7. The method according to claim 6, wherein said conductive wire materials and said connecting plate correspond to a core portion and a crimping portion of a crimping terminal.

8. The method according to claim 1, wherein said conductive wire materials and said connecting plate correspond to a core portion and a crimping portion of a crimping terminal.

9. A method of connecting plural conductive wire materials to a connecting terminal comprising the steps of:

wrapping a plurality of conductive wire materials with an originally flat connecting plate to form a caulking portion surrounding said conductive wire materials;

locating said plurality of conductive wire materials so that a central longitudinal axis of said first electrode is parallel to a central longitudinal axis of said second electrode, and so that said first electrode and second electrode are spaced apart from each other on the same side of said conductive wire materials;

causing said first electrode to abut said conductive wire materials extending from said caulking portion toward said connecting terminal;

causing said second electrode to abut said connecting plate of said caulking portion;

applying voltage between said first electrode and said second electrode by said power supply so that current flows from said first electrode to said second electrode in a path that does not pass through said connecting terminal in order for said plural conductive wire materials to be welded to said connecting plate.

10. The method according to claim 9, wherein said step of locating said plurality of conductive wire materials between a first electrode and a second electrode includes providing said first electrode, abutting said conductive wire materials, with a square planar tip having a width and a length substantially equal to a width and a length of an exposed area of said conductive wire materials extending from said caulking portion toward said connecting terminal, and providing said second electrode, abutting on said conductive plate, with a disk-shaped planar tip having a diameter sufficiently shorter than said width of said exposed area of said conductive wire materials.

11. The method according to claim 10, wherein step of locating said plurality of conductive wire materials between a first electrode and a second electrode includes arranging said first and second electrodes in a longitudinal direction of said conductive wire materials.

12. The method according to claim 11, wherein said conductive wire materials and said connecting plate correspond to a core portion and a crimping portion of a crimping terminal.

13. The method according to claim 10, wherein said conductive wire materials and said connecting plate correspond to a core portion and a crimping portion of a crimping terminal.

14. The method according to claim 9, wherein step of locating said plurality of conductive wire materials between a first electrode and a second electrode includes arranging said first and second electrodes in a longitudinal direction of said conductive wire materials.

15. The method according to claim 14, wherein said conductive wire materials and said connecting plate correspond to a core portion and a crimping portion of a crimping terminal.

16. The method according to claim 9, wherein said conductive wire materials and said connecting plate correspond to a core portion and a crimping portion of a crimping terminal.

* * * * *